United States Patent [19]

Bergner

[11] Patent Number: 5,020,613
[45] Date of Patent: Jun. 4, 1991

[54] DEVICE FOR CUTTING UNDERCUTS

[75] Inventor: Arndt Bergner, Munich, Fed. Rep. of Germany

[73] Assignee: Hilti Aktiengesellschaft

[21] Appl. No.: 549,461

[22] Filed: Jul. 6, 1990

[30] Foreign Application Priority Data

Jul. 7, 1989 [DE] Fed. Rep. of Germany ....... 3922376

[51] Int. Cl.[5] .......................... B28D 1/14; E21B 7/28
[52] U.S. Cl. .................................... 175/273; 408/151
[58] Field of Search ................. 408/150, 151, 59, 202;
175/202, 203, 220, 263, 273, 279; 409/178, 179,
180, 131, 143

[56] References Cited

U.S. PATENT DOCUMENTS 4,930,585  6/1990  Noser et al. ..................... 175/273 X

FOREIGN PATENT DOCUMENTS 0231720  12/1987  European Pat. Off. .

Primary Examiner—Z. R. Bilinsky
Attorney, Agent, or Firm—Toren & McGeady Associates

[57] ABSTRACT

A device, for cutting an undercut in a borehole at a location spaced from the surface of a material into which the borehole is formed, includes a housing (1) with a bore therethrough and a guide sleeve (2) rotatably supported in the housing bore and having an eccentric bore therein. A bushing (3) with an eccentric bore is rotatably supported in the guide sleeve bore. A drive shaft (7) is rotatably supported in and extends through the eccentric bore of the housing and has a cutter head (9) at one end. The drive shaft (7) can be shifted from a centered position within the housing bore into an eccentric position by rotation of the bushing (3) relative to the guide sleeve (2). In the eccentric position, the cutter head (9) can penetrate into and form an undercut in the surface of the borehole. A displaceable snap-in element (16) in the housing (1) prevents rotation of the guide sleeve (2). When the maximum eccentricity of the drive shaft (7) is reached, the snap-in element is disengaged from the guide sleeve by an actuating cam (3a) on the bushing (3). Subsequently, the guide sleeve (2) and the bushing (3) can be rotated together through at least 360° degrees for cutting the undercut. A blocking member (13) prevents rotation of the guide sleeve (2) during rotation of the bushing back into the center position.

3 Claims, 2 Drawing Sheets

DEVICE FOR CUTTING UNDERCUTS

BACKGROUND OF THE INVENTION

The present invention is directed to a device for cutting undercuts in a borehole formed in a material into which the borehole is drilled with the device including a housing bearing against the surface of the material with a guide sleeve located in a bore through the housing. The guide sleeve has an eccentric bore parallel with the bore in the housing and a bushing is positioned within the guide sleeve bore and has an eccentric bore therethrough. The bushing can be rotated through an angle of approximately 180° degrees relative to the guide sleeve. A drive shaft extends through the eccentric bore in the bushing and has a cutter head at one end and can be coupled at the opposite end to a driving device. A blocking member extends from the housing into contact with the guide sleeve so that the guide sleeve can be rotated only in one direction relative to the housing.

Undercuts in bores are produced mainly for receiving correspondingly designed anchor dowels which can be anchored in a positively locked manner in the undercut. Due to the costly methods of fabricating undercuts or the malfunction-prone devices for carrying out the methods, up to the present time such dowels have not been used to any great extent.

A drilling device for cutting undercuts in boreholes is disclosed in EP-A 0 231 720, however, it is relatively cumbersome to handle. In this device the eccentricity of the guide sleeve corresponds to that of the eccentric bushing. As a result, the drive shaft is arranged centrally in the guide sleeve in one end position of the guide sleeve and the eccentric bushing, in the other end position of the eccentric bushing rotated through an angle of 180°, the drive shaft is pressed radially outwardly against the surface of the borehole by twice the amount of the eccentricity with the cutting head penetrating into the material containing the borehole. With such penetration, the eccentric bushing and the guide sleeve are turned together through an angle of at least 360°. As a result, a circumferentially extending undercut is produced in the borehole wall. Subsequently, the eccentric bushing is rotated further or in reverse through 180° in the guide sleeve for positioning the drive shaft centrally in the guide sleeve so that the device can be removed from the borehole. Possible entrainment of the guide sleeve is prevented by a pin which can be extended or retracted manually. The pin is retracted when the eccentric bushing is to be turned relative to the guide sleeve for penetration into the borehole surface and is extended into the eccentric bushing for fabrication of a circumferentially extending undercut.

In DE-A 38 09 761 a blocking element is provided between the housing and the guide sleeve allowing the guide sleeve to turn only in one direction of rotation in the housing. The blocking element prevents entrainment of the guide sleeve when the eccentric bushing is rotated in the opposite direction. The blocking element, however, does not prevent entrainment of the guide sleeve during the rotational movement required for the penetration of the cutting head into the material containing the borehole.

SUMMARY OF THE INVENTION

It is the primary object of the present invention to provide a device for cutting undercuts in boreholes formed in a material which permits simple manipulation of the device, as well as insuring its reliable operation.

In accordance with the present invention, a snap-in element for the guide sleeve is provided in the housing and is disengageable through or by the bushing affording a locked connection between the housing and the guide sleeve preventing rotation of the sleeve in the engaged position, while in the disengaged position affording relative rotation between the housing and guide sleeve.

Since the guide sleeve can be secured against rotating relative to the housing by means of the snap-in element which is disengageable by the bushing, a relative rotation between the eccentric bushing and the guide sleeve is possible. Such relative rotation is necessary for moving the drive shaft and cutter head from a centered position needed for insertion of the device into a borehole into an eccentric position necessary for cutting undercut. After the undercut has been formed, the cutter head must again be returned to the centered position so that is can be removed from the borehole. When such movement is effected, the guide sleeve is again secured against entrainment by the bushing by the snap-in element. Accordingly, engagement or disengagement of the snap-in element is effected automatically by the bushing.

An actuating cam for extending the snap-in element is provided on the bushing. When the bushing is rotated, the actuating cam contacts the snap-in element and causes its disengagement from the guide sleeve. With such disengagement, the guide sleeve can rotate freely. When the actuating cam is moved from the snap-in element, the element can again become engaged and the guide sleeve held from rotation.

Advantageously, the snap-in element is formed as a latch displacable approximately radially against a spring biasing force. Preferably, the spring acts on the latch biasing it toward the engaged position. As a result, disengagement of the snap-in element takes place counter to the spring force.

The various features of novelty which characterize the invention are pointed out with a particularity in the claims annexed to and forming a part of this disclosure. For a better understanding of the invention, its operating advantages and specific objects attained by it do, references should be had to the drawings and description matter in which there are illustrated and described preferred embodiments of the invention.

DETAILED DESCRIPTION OF THE INVENTION

Figure 1:
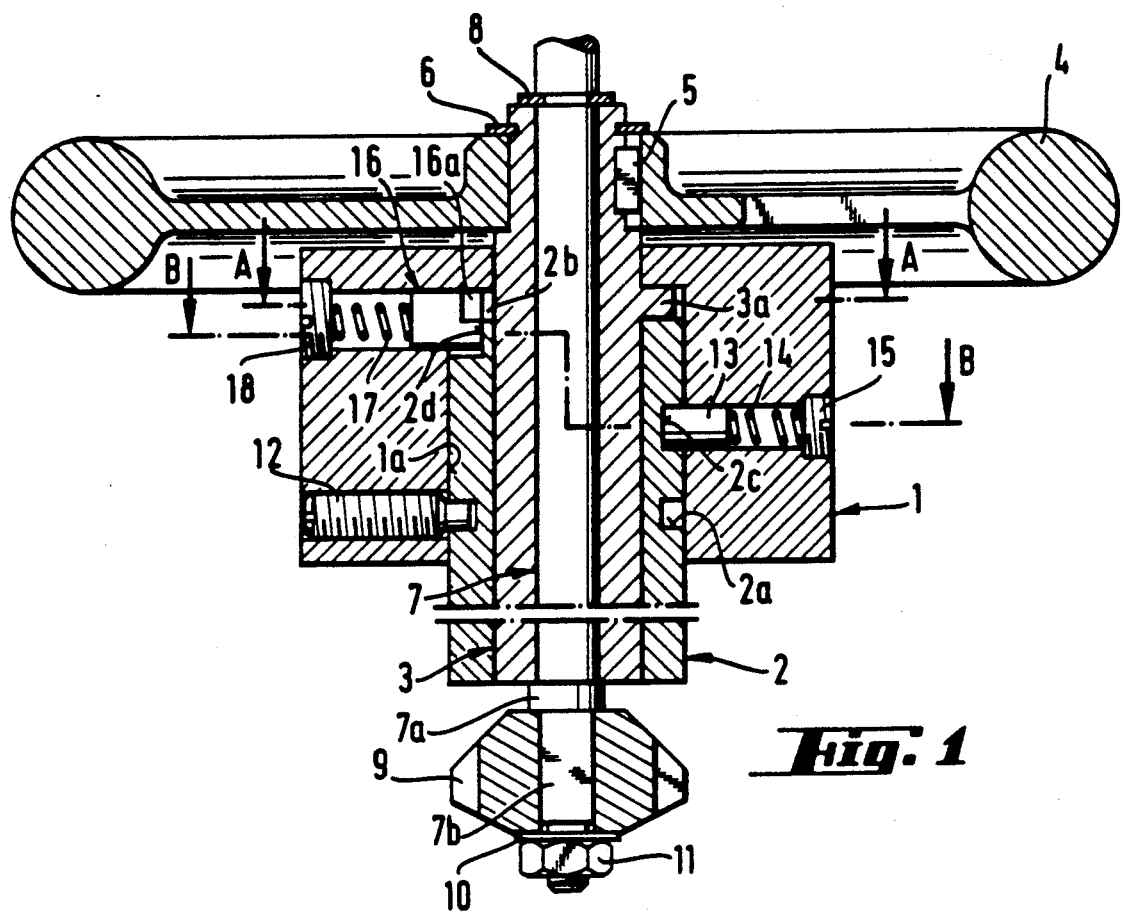
FIG. 1 is a axially extending sectional view of a device embodying the present invention.

In FIGS. 1 to 7 a device is illustrated for cutting an undercut in a borehole drilled in a material. The device comprises a housing 1 with a central bore 1a. A guide sleeve 2 is rotatably supported in the housing bore 1a. The guide sleeve 2 has an eccentric bore extending there through. A bushing 3 is rotatably supported in the eccentric bore of the guide sleeve and extends parallel with the axis of the housing. As viewed in FIG. 1, the bushing 3 has a handwheel 4 at its upper end projected upwardly from the housing 1. Rotational entrainment between the bushing and the handwheel is effected by a key 5 and the hand wheel is secured in the axial direction by a circlip or snap ring 6. Accordingly, bushing 3 can be turned or rotated by the handwheel. A drive shaft 7 is rotatably supported in an eccentric bore in the bushing 3. Drive shaft 7 is secured in the axial direction between its collar 7a bearing against the lower end of the bushing 3 and a snap ring 8 secured in the drive shaft at the upper end of the bushing. Below the collar 7a the drive shaft has an axially extending foursided shaft section 7b for a rotationally looked connection with a cutter head 9. Cutter head 9 is secured on the lower end of the drive shaft 7 by a washer 10 and a hexagonal nut 7. Guide sleeve 2 has an annular groove 2a in its outer surface within the axial range of the housing 1 and a threaded pin 12 extends through the housing into the annular groove for axially securing the guide sleeve. Spaced upwardly from the threaded pin 12 is a pin-shaped blocking member 13 located in a radially extended opening through the housing and biased by a compression spring 14 against the outside surface of the guide sleeve 2. The outer end of blocking member 13 bears against the compression spring 14 and the other end of the spring bears against a sealing plug 15. Above the blocking member 13 is a snap-in element 16 located on the opposite side of the guide sleeve. Snap-in element 16 biased against the guide sleeve by a compression spring 17 and the outer end of the spring bears against a sealing plug 18 threaded into the housing.

Figure 2:
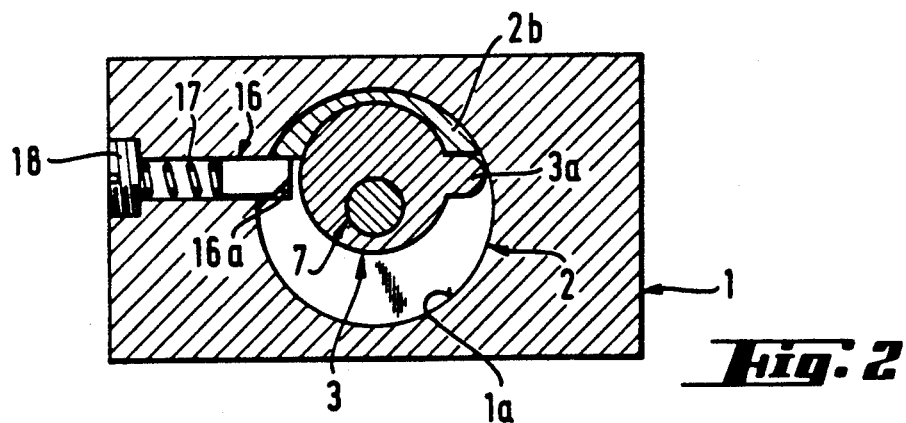
FIG. 2 is a cross sectional view of the device taken along line A—A in FIG. 1 displaying the initial position of the device.
Figure 3:
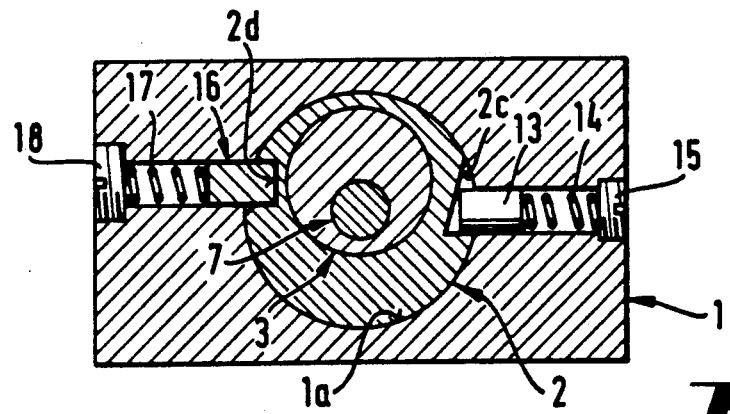
FIG. 3 is a cross sectional view through the device taken along the line B—B depicting the initial position of the device.
Figure 4:
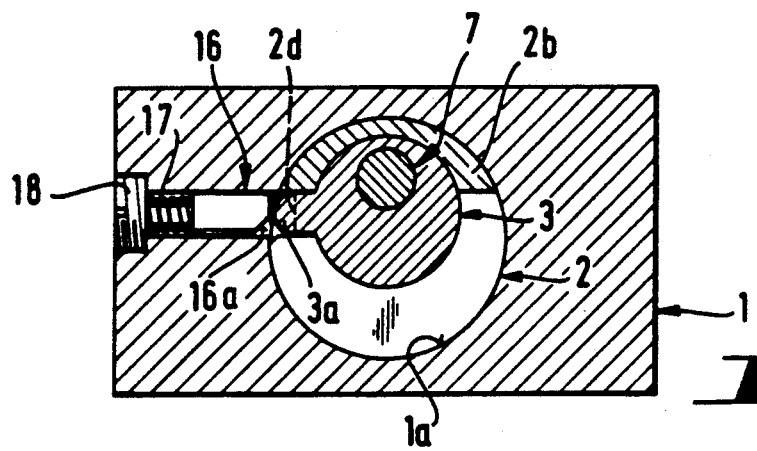
FIG. 4 is a cross sectional view through the device taken along the line A—A in FIG. 1 with the bushing rotated through 180°.
Figure 5:
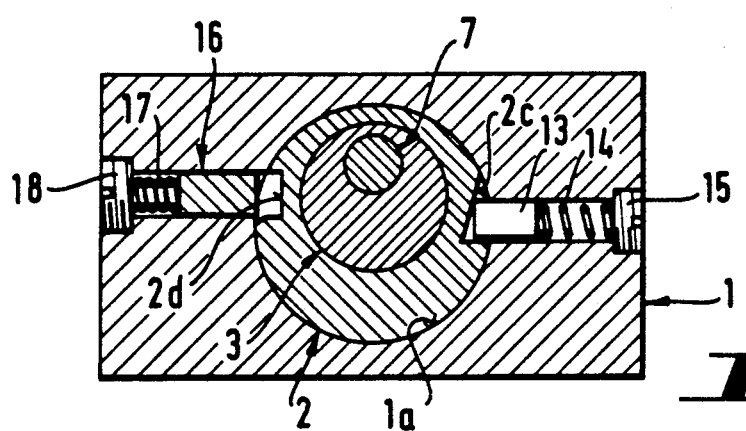
FIG. 5 is a cross sectional view through the device taken along line B—B in FIG. 1 also with the bushing rotated through 1890°.
Figure 6:
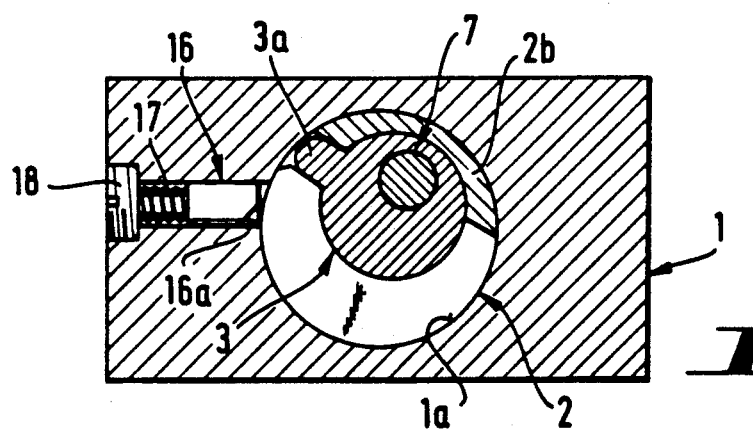
FIG. 6 is a cross sectional view through the device taken along the line A—A in FIG. 1 with both the bushing and the guide sleeve rotated.
Figure 7:
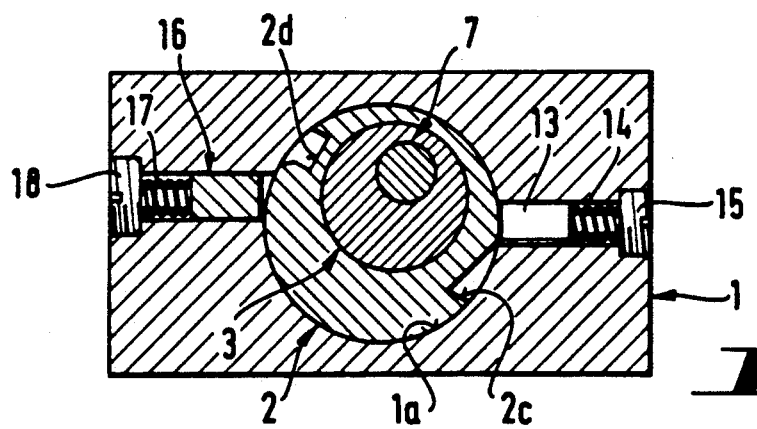
FIG. 7 is a cross sectional view through the device taken along the line B—B in FIG. 1 with both the bushing and the guide sleeve rotated.

In the initial position of the device shown in FIGS. 1 to 3 the eccentricities of the bores in the guide sleeve 2 and the bushing 3 cancel one another out, whereby the drive shaft 7 with the cutter head 9 is located in a centered position relative to the bore 1a in the housing 1. In this position, blocking member 13 engages in a wedge-shaped blocking groove 2c in the outside surface of the guide sleeve 2. The snap-in element 16 is biased inwardly into a groove 2d in the outside surface of the guide sleeve 2. The bushing 3 has an outwardly projecting actuating cam 3a located in the groove 2d at the right hand side of the bushing in FIG. 2 in contact with a circumferentially extending section 2b of the guide sleeve 2. In the initial position shown in FIGS. 2 and 3, the device can be inserted into a previously drilled borehole, not shown. The drive shaft 7 can be connected with a driving device, not shown. As viewed in FIG. 2, the bushing 3 can rotate in the clockwise direction. During such rotation, guide sleeve 2 is secured against rotation along with the eccentric bushing by the snap-in element 16 located in the groove 2d. After the bushing 3 is turned through 180°, its actuating cam 3a runs up against a chamfer 16a on the inner end of the snap-in elements 16 and displaces the snap-in element radially outwardly out of engagement with the groove 2d. In this position, the eccentricity of the guide sleeve 2 is added to that of the bore in the bushing 3. As a result, drive shaft 7 is in its maximum eccentric position. This position is shown in FIGS. 4 and 5. In this position the blocking member 13 continues to engage in the blocking groove 2c in the guide sleeve 2.

Because of the disengagement of the snap-in element 16, the guide sleeve can be rotated in the clockwise direction. During further rotation of the bushing 3 the guide sleeve 2 is carried along by the cam 3a contacting the left hand side of the section 2b. Due to the wedge-shaped configuration of the blocking groove 2c, the blocking member 13 is shifted out of the groove. This position of the device is displayed in FIGS. 6 and 7. With further clockwise rotation of the bushing 3 through at least 360°, a complete circumferential undercut is formed by the cutter head 9 connected on the drive shaft to 7. When the undercut has been completed the drive shaft must again be located in the centered position relative to the housing bore 1a, so that the device can be removed from the borehole. Such positioning is effected by turning the bushing 3 in the counterclockwise direction. Initially, the guide sleeve 2 is carried along with the bushing until the blocking element 13 again engages into the blocking groove 2c. Subsequently, the bushing is turned through 180° relative to the guide sleeve 2 until the actuation cam (3a) reaching the position shown in FIG. 2. In this position snap-in element 16 is biased back into the groove 2d. The drive shaft 7 is again in the centered position with respect to the housing bore 1a. Accordingly, the device can be pulled out of the borehole.

While specific embodiments of the invention have been shown and described in detail to illustrate the application of the inventive principles, it will be understood that the invention may be embodied otherwise without departing from such principles.

What is claimed is:

1. Device for cutting an undercut in a borehole at a location spaced from the surface of a material into which the borehole is formed, comprising a housing (1) arranged to abut against the surface of the material and having a axially extending bore (1a) therein, a guide sleeve (2) mounted in said housing bore, said guide sleeve (2) having an eccentric bore therethrough disposed parallel to the axis of said housing bore, a bushing (3) rotatably mounted within said guide sleeve bore and having an eccentric bore therethrough parallel to the guide sleeve bore, said bushing (3) being rotatably displacable within said guide sleeve (2) through an angle of approximately 180°, a drive shaft (7) extending through and rotatably supported in the eccentric bore of said bushing, said shaft (7) having a first end extending out of one end of said bushing with a cutting head secured thereon and a second end extending out of an opposite end of said bushing and arranged to be coupled with a driving device, blocking means (13) in said housing and displacably engageable with said guide sleeve for permitting rotation of said guide sleeve (2) within the housing bore in only rotational direction, wherein the improvement comprising a snap-in element (16) mounted in said housing and extendable into said housing bore, said snap-in element (16) is radially displacable from said housing bore by said bushing, said snap-in element having an engaged position within said housing bore with said guide sleeve (2) locking said guide sleeve against rotation relative to said housing (1) and a disengaged position displaced from said housing bore permitting relative rotation between said housing and said guide sleeve.

2. Device as set forth in claim 1, wherein a actuation cam (3a) is located on a outer surface of said bushing for contacting said snap-in element (16) and displacing the snap-in element out of engagement with said guide sleeve (2).

3. Device, as set forth in claim 1, wherein said snap-in element (16) comprises a latch biased radially inwardly by a spring member for engagement in the engaged position with said guide sleeve (2).

* * * * *